US011876698B2

(12) United States Patent
Wolf et al.

(10) Patent No.: US 11,876,698 B2
(45) Date of Patent: Jan. 16, 2024

(54) HIGH-SPEED HARDWARE-BASED TRAFFIC ANALYZER INTEGRATION WITH SPEED TEST CONTROL APPLICATION

(71) Applicant: VIAVI SOLUTIONS INC., San Jose, CA (US)

(72) Inventors: Hans-Joerg Wolf, Woodbine, MD (US); Jyotikumar Menon, Clarksburg, MD (US); Anand Gajjala, Herndon, VA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/725,674

(22) Filed: Apr. 21, 2022

(65) Prior Publication Data

US 2023/0344742 A1   Oct. 26, 2023

(51) Int. Cl.
| | |
|---|---|
| *H04L 43/50* | (2022.01) |
| *H04L 43/0888* | (2022.01) |
| *H04L 43/062* | (2022.01) |
| *H04L 43/20* | (2022.01) |
| *H04L 43/08* | (2022.01) |

(Continued)

(52) U.S. Cl.
CPC ............ *H04L 43/50* (2013.01); *H04L 43/062* (2013.01); *H04L 43/08* (2013.01); *H04L 43/0888* (2013.01); *H04L 43/20* (2022.05); *H04L 67/01* (2022.05); *H04L 67/10* (2013.01)

(58) Field of Classification Search
CPC ... H04L 43/50; H04L 43/062; H04L 43/0894; H04L 43/0888; H04L 43/0876; H04L 43/08; H04L 43/103; H04L 67/01; H04L 67/10; H04L 43/20
See application file for complete search history.

(56) References Cited

U.S. PATENT DOCUMENTS

| | | | | |
|---|---|---|---|---|
| 2013/0343181 | A1* | 12/2013 | Stroud | H04L 69/22 |
| | | | | 370/392 |
| 2016/0080241 | A1* | 3/2016 | Rocha De Maria | H04L 43/50 |
| | | | | 370/252 |

(Continued)

FOREIGN PATENT DOCUMENTS

WO   WO-2020172209 A1 *  8/2020  ......... G06F 11/3495

OTHER PUBLICATIONS

Constantine, B., Forget, G., Geib, R., and R. Schrage, "Framework for TCP Throughput Testing", RFC 6349, DOI 10.17487/ RFC6349, Aug. 2011, <https://www.rfc-editor.org/info/rfc6349>. (Year: 2011).*

*Primary Examiner* — Glenton B Burgess
*Assistant Examiner* — Rachel J Hackenberg
(74) *Attorney, Agent, or Firm* — Mannava & Kang, P.C.

(57) ABSTRACT

In some examples, high-speed hardware-based traffic analyzer integration with speed test control application may include receiving, from a speed test control application, speed test control instructions and data connection instructions to perform an upload and download high-speed test associated with network traffic for a network. The speed test control instructions and the data connection instructions may be forwarded to a speed test control server. A hardware-based traffic analyzer may perform, based on the speed test control instructions and the data connection instructions, the high-speed test associated with the network traffic for the network.

15 Claims, 9 Drawing Sheets

(51) Int. Cl.
   *H04L 67/01*     (2022.01)
   *H04L 67/10*     (2022.01)

(56)         References Cited

U.S. PATENT DOCUMENTS

2017/0279921 A1*  9/2017  Foulkes ................ G06F 9/5038
2019/0230012 A1*  7/2019  Azizullah ........... H04L 41/0226
2019/0230017 A1*  7/2019  Wolf ....................... H04L 43/10
2020/0059428 A1*  2/2020  Nadeau ............... H04L 41/5067
2020/0313999 A1* 10/2020  Lee ..................... H04L 43/0847

* cited by examiner

800

```
┌─────────────────────────────────────────────────────────────────┐
│ RECEIVE, FROM A SPEED TEST CONTROL APPLICATION, SPEED TEST      │
│ CONTROL INSTRUCTIONS AND DATA CONNECTION INSTRUCTIONS TO        │
│ PERFORM AN UPLOAD AND DOWNLOAD HIGH-SPEED TEST ASSOCIATED       │
│           WITH NETWORK TRAFFIC FOR A NETWORK                    │
│                            802                                  │
└─────────────────────────────────────────────────────────────────┘
                              │
                              ▼
┌─────────────────────────────────────────────────────────────────┐
│   FORWARD THE SPEED TEST CONTROL INSTRUCTIONS AND THE DATA      │
│    CONNECTION INSTRUCTIONS TO A SPEED TEST CONTROL SERVER       │
│                            804                                  │
└─────────────────────────────────────────────────────────────────┘
                              │
                              ▼
┌─────────────────────────────────────────────────────────────────┐
│  PERFORM, BY A HARDWARE-BASED TRAFFIC ANALYZER, BASED ON        │
│    THE SPEED TEST CONTROL INSTRUCTIONS AND THE DATA             │
│   CONNECTION INSTRUCTIONS, THE HIGH-SPEED TEST ASSOCIATED       │
│         WITH THE NETWORK TRAFFIC FOR THE NETWORK                │
│                            806                                  │
└─────────────────────────────────────────────────────────────────┘
```

FIG. 8

HIGH-SPEED HARDWARE-BASED TRAFFIC ANALYZER INTEGRATION WITH SPEED TEST CONTROL APPLICATION

BACKGROUND

With respect to general-purpose CPUs, such CPUs may include architectures for handling a wide variety of processing loads. For example, a general-purpose CPU may include an architecture designed to handle applications such as speed test applications that perform an upload and download speed test associated with network traffic for a network.

BRIEF DESCRIPTION OF DRAWINGS

Features of the present disclosure are illustrated by way of example and not limited in the following figure(s), in which like numerals indicate like elements, in which:

FIG. 8 illustrates a flowchart of an example method for high-speed hardware-based traffic analyzer integration with speed test control application in accordance with an example of the present disclosure.

DETAILED DESCRIPTION

Figure 1:
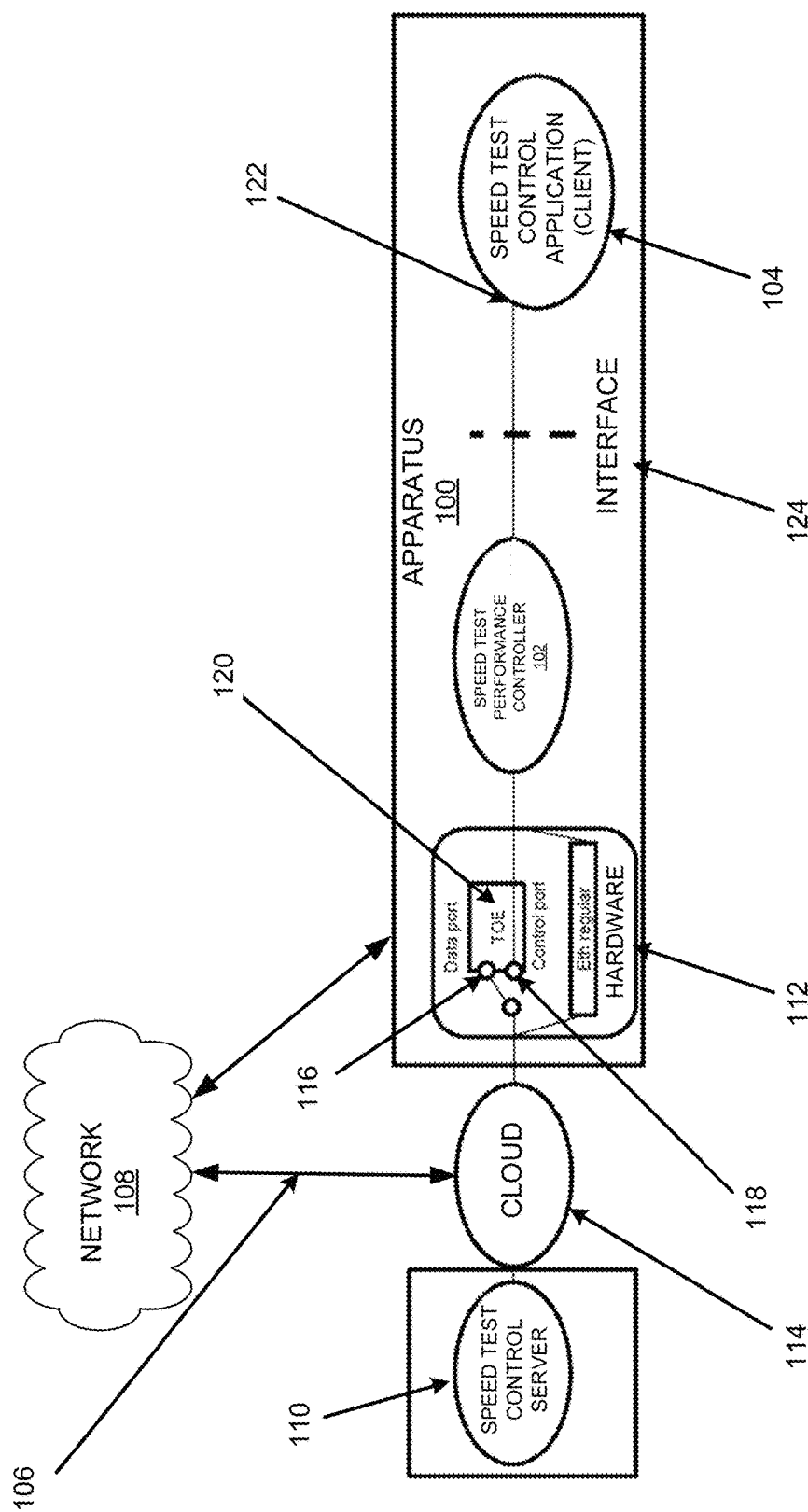
FIG. 1 illustrates a layout of a high-speed hardware-based traffic analyzer integration with speed test control application apparatus, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

High-speed hardware-based traffic analyzer integration with speed test control application apparatuses, methods for high-speed hardware-based traffic analyzer integration with speed test control application, and non-transitory computer readable media having stored thereon machine readable instructions to provide high-speed hardware-based traffic analyzer integration with speed test control application are disclosed herein. The apparatuses, methods, and non-transitory computer readable media disclosed herein provide for integration of a third-party speed test control application with a high-speed hardware-based traffic analyzer. The speed test control application may be responsible for the establishment of control and data connections to a speed test control server in the Cloud. The hardware-based traffic analyzer may be responsible for transmitting and receiving high bit-rate data traffic over the data connections. The speed test control application may operate on a general-purpose central processing unit (CPU).

With respect to general-purpose CPUs, as disclosed herein, such CPUs may include architectures for handling a wide variety of processing loads. As such, it is technically challenging to utilize such general-purpose CPUs to efficiently and adequately handle high speed network traffic.

In order to address at least the aforementioned technical challenges, the apparatuses, methods, and non-transitory computer readable media disclosed herein may leverage the paradigm of distributing the processing load of the speed test control application on a general-purpose CPU and traffic generation and associated analysis on hardware designed and optimized for high-speed processing of network traffic. In this regard, the apparatuses, methods, and non-transitory computer readable media disclosed herein may establish, via the speed test control application, a path for data traffic based on specified protocols between a client (e.g., the speed test control application) and a server, and then handing over of the path to a hardware engine (e.g., the hardware-based traffic analyzer) for a high-speed traffic generation and receiving phase. This handover may be handled by a speed test performance controller of the apparatuses, methods, and non-transitory computer readable media disclosed herein, which may exist separate from the speed test control application. The apparatuses, methods, and non-transitory computer readable media disclosed herein may control the hardware-based traffic analyzer, and manage the configuration of the hardware-based traffic analyzer and the results collection by the hardware-based traffic analyzer.

For the apparatuses, methods, and non-transitory computer readable media disclosed herein, the hardware-based traffic analyzer may be implemented to include a Field Programmable Gate Array (FPGA). In this regard, a Transmission Control Protocol/Internet Protocol (TCP/IP) stack of the FPGA may handle the high-speed data, and provide throughput on the order of 10 Gbps and higher. In one example, the speed test control application may include an Ookla™ speed test control application to perform an upload and download speed test associated with network traffic for a network. The apparatuses, methods, and non-transitory computer readable media disclosed herein may integrate the speed test control application with the hardware-based traffic analyzer as disclosed herein.

The apparatuses, methods, and non-transitory computer readable media disclosed herein may channel relatively slow-speed control traffic (e.g., address resolution protocol (ARP), Packet Internet or Inter-Network Groper (PING), etc.) to the CPU, whereas the relatively high-speed traffic (e.g., performance sensitive traffic) may be handled by the hardware-based traffic analyzer over a high-speed bus. In this regard, control and data connections may be set up on a speed test control server running on the Cloud. These connections may then be handed off via a speed test performance controller to the hardware-based traffic analyzer which then handles the performance intensive component of transmission and reception of traffic as disclosed herein. Periodically, the speed test control application may query results associated with a speed test. The parallelization of the speed test between a relatively slow speed CPU and a relatively higher speed hardware-based traffic analyzer may provide for higher performance of a speed test, and may also allow for scaling as needed to account for higher speed traffic.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example high-speed hardware-based traffic analyzer integration with speed test control application apparatus (hereinafter also referred to as "apparatus 100").

Referring to FIG. 1, the apparatus 100 may include a speed test performance controller 102 to receive, from a speed test control application 104, speed test control instructions and data connection instructions to perform an upload and download high-speed test associated with network traffic 106 for a network 108. The speed test performance controller 102 may forward the speed test control instructions and the data connection instructions to a speed test control server 110.

The speed test control application 104 may be implemented by a central processing unit (CPU).

A hardware-based traffic analyzer 112 may perform, based on the speed test control instructions and the data connection instructions, the high-speed test associated with the network traffic 106 for the network 108. The hardware-based traffic analyzer 112 may include a Field Programmable Gate Array (FPGA).

The apparatus 100 may forward the speed test control instructions and the data connection instructions to the speed test control server 110 in a Cloud environment 114.

The hardware-based traffic analyzer 112 may perform, based on the speed test control instructions and the data connection instructions, the high-speed test by transmitting and receiving high bit-rate data over at least one data connection implemented by the data connection instructions. For example, the at least one data connection may be implemented via data port 116.

The apparatus 100 may receive, based on the performance of the high-speed test, results of the high-speed test from the speed test control server 110. Further, the results of the high-speed test may be forwarded to the speed test control application 104.

The apparatus 100 may utilize Transmission Control Protocol/Internet Protocol (TCP/IP) to transmit data between the speed test control server 110 and the hardware-based traffic analyzer 112. Thus, the apparatus 100 may communicate with the speed test control server 110 via a protocol, such as TCP/IP.

Data port 116 and control port 118 may be separated as shown in FIG. 1. The data port 116 may be utilized to handle upload and download data associated with the high-speed test. The control port 118 may be utilized to send control traffic to the speed test control application 104. Traffic offload engine (TOE) 120 may implement the TCP-IP component of the stack. A control port 122 may be utilized by the speed test control application 104 to communicate control instructions and to receive statistics and other types of speed test results from the speed test performance controller 102. As described in further detail with reference to FIG. 4, an interface 124 may be implemented between the speed test performance controller 102 and the speed test control application 104.

The apparatus 100 may be any type of product on which the speed test control application 104 may be executed. For example, the apparatus 100 may be a Viavi™ Network and Service Companion (NSC).

Operation of the apparatus 100 is described in further detail with reference to FIGS. 2-7.

Figure 2:
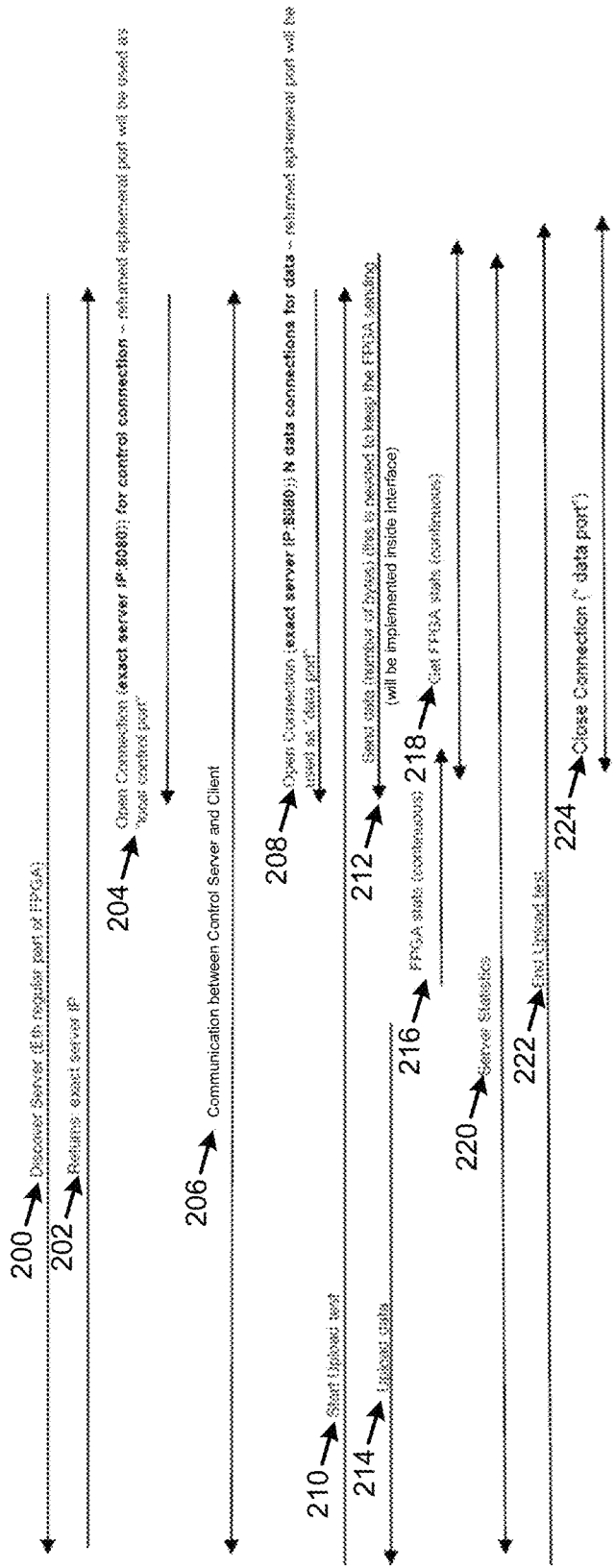
FIG. 2 illustrates a sequence diagram for an upload test to illustrate operation of the high-speed hardware-based traffic analyzer integration with speed test control application apparatus of FIG. 1, in accordance with an example of the present disclosure.

FIG. 2 illustrates a sequence diagram for an upload test to illustrate operation of the apparatus 100, in accordance with an example of the present disclosure.

Referring to FIG. 2, at 200, the apparatus 100 may discover the speed test control server 110. At 202, the speed test control server 110 may return an exact speed test control server IP (e.g., IP:8080). At 204, the apparatus 100 may open a connection (e.g., exact speed test control server IP:8080) for control connection. At 206, communication may proceed between the speed test control server 110 and the speed test control application 104 (e.g., the client). At 208, the apparatus 100 may open connection (e.g., exact speed test control server IP:8080), where the returned ephemeral port will be used as the data port 116. The data and control channel connections may be opened simultaneously.

At 210, the apparatus 100 may start the upload test. At 212, data may be sent to the hardware-based traffic analyzer 112 (e.g., FPGA). At 214, data may be uploaded to the hardware-based traffic analyzer 112. At 216, the hardware-based traffic analyzer 112 stats may be received by the speed test performance controller 102 and sent to the speed test control application 104. At 218, the hardware-based traffic analyzer stats may be obtained by the speed test performance controller 102 on a continuous basis. At 220, server statistics may be obtained by the speed test performance controller 102 and sent to the speed test control application 104. At 222, the uploaded test may be completed. Further, at 224, the apparatus 100 may close the connection (e.g., "data port").

Figure 3:
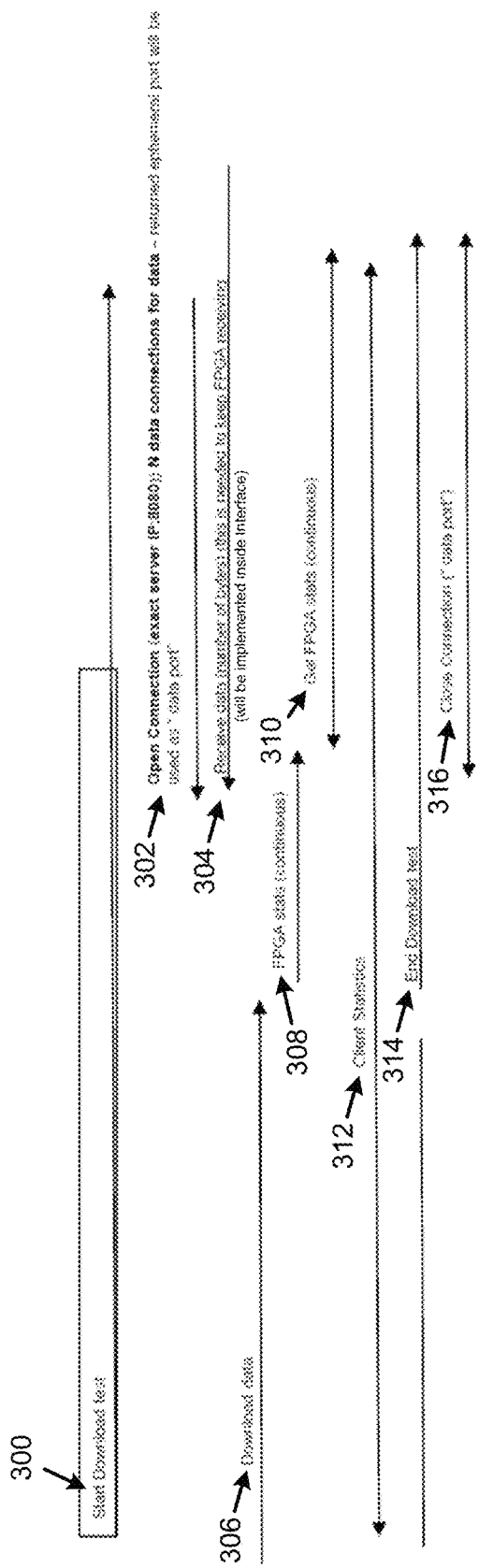
FIG. 3 illustrates a sequence diagram for a download test to illustrate operation of the high-speed hardware-based traffic analyzer integration with speed test control application apparatus of FIG. 1, in accordance with an example of the present disclosure.

FIG. 3 illustrates a sequence diagram for a download test to illustrate operation of the apparatus 100, in accordance with an example of the present disclosure.

Referring to FIG. 3, with respect to a download test, at 300, the apparatus 100 may start the download test. At 302, the apparatus 100 may open connection (e.g., exact speed test control server IP:8080), where the returned ephemeral port will be used as the data port 116. At 304, the apparatus 100 may receive data. At 306, data may be downloaded to the hardware-based traffic analyzer 112. At 308, the hardware-based traffic analyzer statistics may be received. At 310, the hardware-based traffic analyzer statistics may be obtained on a continuous basis. At 312, the download statistics may be obtained by the speed test performance controller 102 and sent to the speed test control application 104. At 314, the download test may be completed. Further, at 316, the apparatus 100 may close the connection to the data port 116.

With respect to steps 308 and 310, examples of the hardware-based traffic analyzer statistics may include:
Tx payload byte count (excluding retransmitted bytes)
Rx Payload byte count (excluding duplicate bytes)
Tx Total frame count
Rx Total frame count
Tx Total retransmission count
Tx retransmission count (timeout related)
Tx retransmission count (Fast Retransmit, Triple ACK)
Tx retransmission count (Fast recovery)
Tx ACK count
Rx ACK count
Acknowledged payload byte count
Max unacknowledged data, in-flight data
Current/Min/Max/Avg RTT
Current/Min/Max/Avg Window Size
Current/Min/Max/Avg Throughput
Send Window Closed count
Send Window probe count
Send Window update count
Number of single frame loss
Number of multiple frame loss FIG. 4 illustrates the interface 124 implemented by the apparatus 100, in accordance with an example of the present disclosure.

Figure 4:
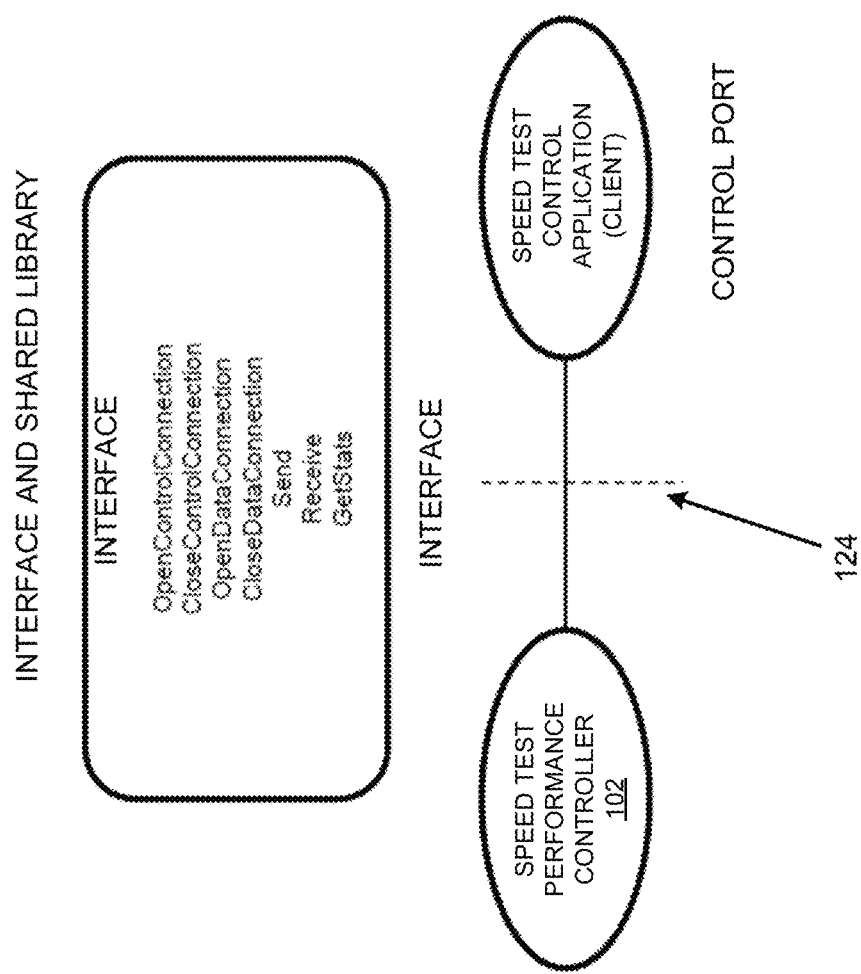
FIG. 4 illustrates an interface implemented by the high-speed hardware-based traffic analyzer integration with speed test control application apparatus of FIG. 1, in accordance with an example of the present disclosure.

Referring to FIG. 4, the interface 124 may be implemented between the speed test performance controller 102 and the speed test control application 104. The interface 124 may provide, via a shared library, functionality such as open control connection, close control connection, open data connection, close data connection, send and receive functionality, and statistics associated with the speed test.

Figure 5:
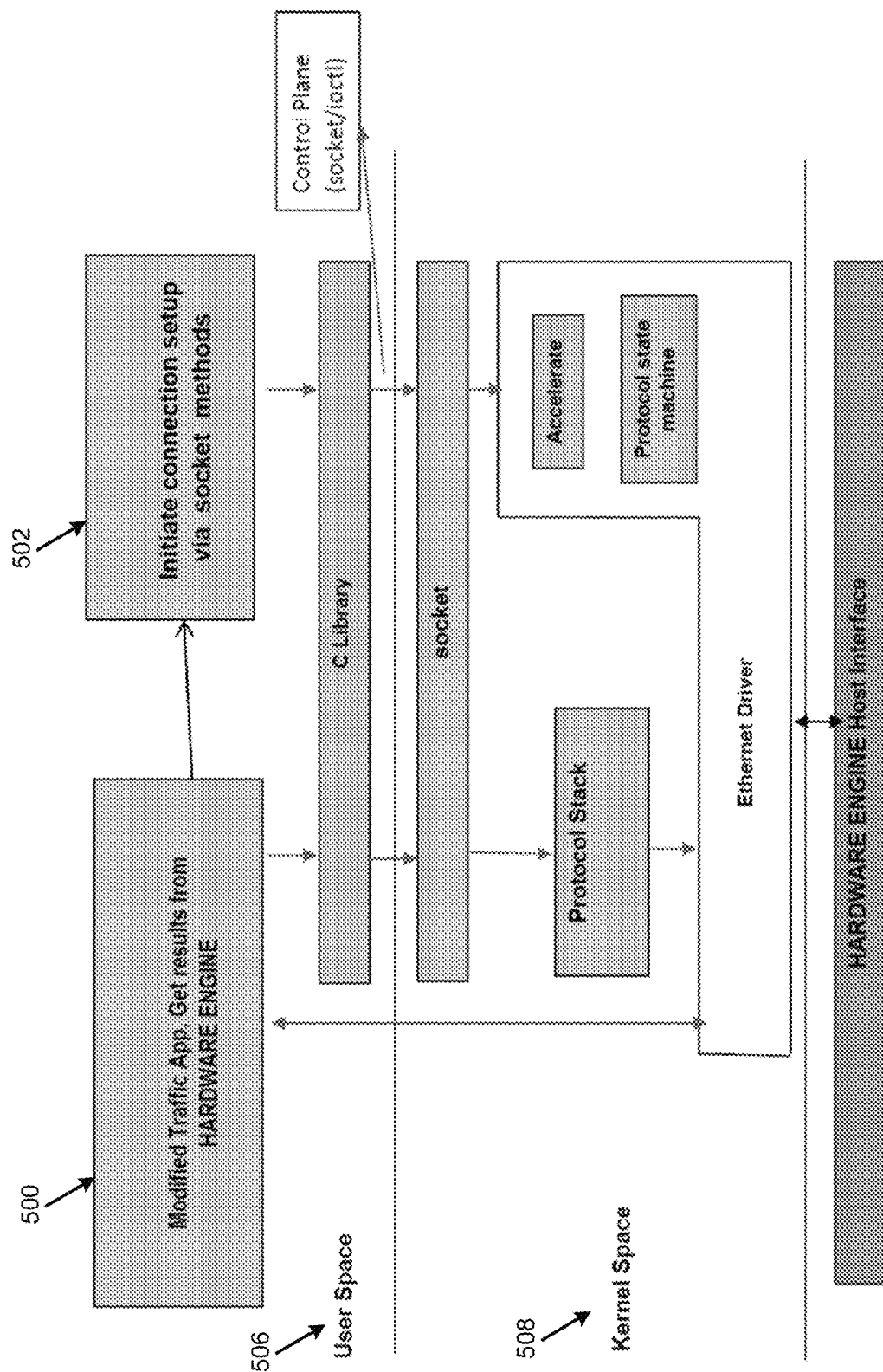
FIG. 5 illustrates an architecture of the high-speed hardware-based traffic analyzer integration with speed test control application apparatus of FIG. 1, in accordance with an example of the present disclosure.

FIG. 5 illustrates an architecture of the apparatus 100, in accordance with an example of the present disclosure.

Referring to FIG. 5, with respect to the architecture of the apparatus 100, at 500, the speed test control application 104 (e.g., traffic application) may start the connection setup at 502 using socket calls with the address family. The traffic state machine in the driver may manage the connection for the test traffic. The speed test control application 104 may initiate a driver to prompt the hardware-based traffic analyzer 112 at 504 to transmit test traffic. The hardware-based traffic analyzer 112 may handle generation and reception of test traffic, ACK/retransmission processing, and maintain per connection statistics. Further, the speed test control application 104 may read statistics from the hardware-based traffic analyzer 112, and determine associated results.

Figure 6:
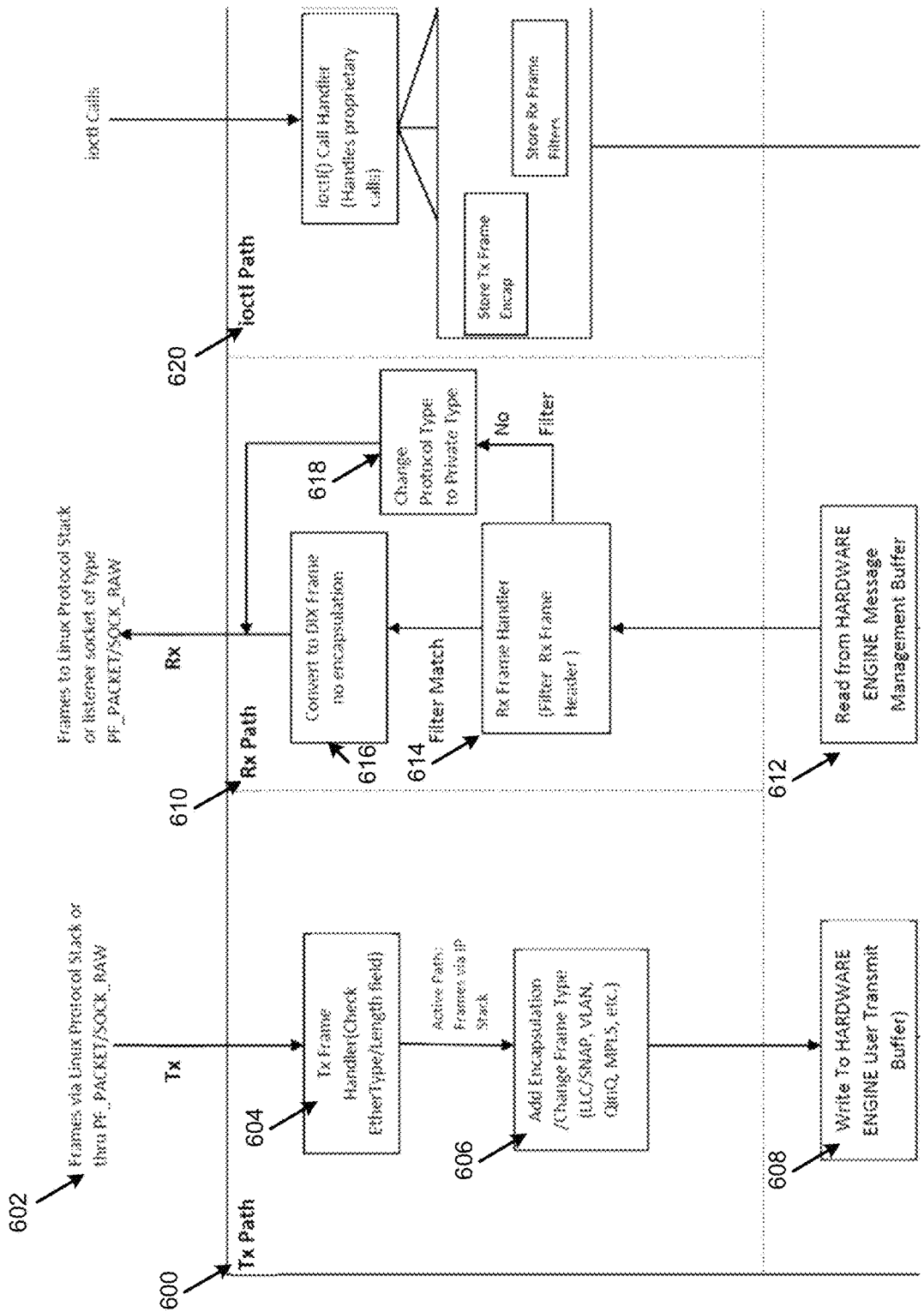
FIG. 6 illustrates details of transmit and receive paths associated with the high-speed hardware-based traffic analyzer integration with speed test control application apparatus of FIG. 1, in accordance with an example of the present disclosure.

FIG. 6 illustrates details of transmit and receive paths associated with the apparatus 100, in accordance with an example of the present disclosure.

Referring to FIGS. 5 and 6, details of the transmit (Tx) and receive (Rx) paths between user space 506 and Kernel space 508, and the hardware-based traffic analyzer 112 are shown in FIG. 6.

With respect to the transmit (Tx) path at 600, at 602, a user space speed test control application socket may call and pass frames to an Ethernet driver in Kernel space. At 604, a Tx frame handler may move the frame from the socket buffer (skb) to a Tx buffer. At 606, an additional header may be added based on the Tx Header input/output control (ioctl) by the speed test control application 104. At 608, a frame may be copied from the Tx buffer to the hardware-based traffic analyzer 112 and transmitted. The hardware-based traffic analyzer 112 may interrupt the CPU after frame Tx.

With respect to the receive (Rx) path at 610, at 612, the hardware-based traffic analyzer 112 may copy a frame into a message management buffer (MMB) and interrupt the CPU. The Ethernet driver may examine the frame header when the frame is copied from the message management buffer to the socket buffer. At 614, the Rx frame handler may apply a filter configured via input/output control to decide whether the frame will be sent to a protocol stack or will be delivered to a raw socket. At 616, if the filter matches the encapsulation or an Logical Link Control/Sub-Network Access Protocol (LLC/SNAP) header is stripped, an untagged Digital Intel Xerox (DIX) frame is passed to a protocol stack. Alternatively, at 618, the frame is passed unaltered after ether type is changed to private.

Next, with respect to the input/output control path at 620, Tx header information may be passed from the user space application to the driver for outgoing frames. Interrupts may be enabled/disabled. Further, Rx filters may be set for incoming frames.

With respect to the communication setup for the hardware-based traffic analyzer 112, a specified address family may be registered via modifications in the proprietary Ethernet driver over the hardware-based traffic analyzer 112 interface. This Kernel module may be loaded at system startup and creates N network interfaces that are named fpeth0 . . . fpethN. The hardware-based traffic analyzer 112 may be connected to a test hardware network interface controller (NIC), and is the physical device for this network driver. The driver may transmit Ethernet packets via the hardware-based traffic analyzer 112 user transmit buffer port (UTB). The driver may receive Ethernet packets through a management message (MM) interface data port of the hardware-based traffic analyzer 112. This includes a specified struct ipbsock instead of a struct sock which may be part of a Linux™ networking upper socket layer visible at the process level and is low-level protocol specific.

In order to set up the SOCK_STREAM socket when the speed test control application 104 is running as a client and when running as a server, all socket related calls may originate in user-space, whereas the processing may be performed in the Kernel-space. Some of these calls may return immediately, while others may block and return later. Kernel timers may be used to obtain a connection status from the hardware-based traffic analyzer 112 and handle other timer related processing. Incoming frames (e.g., connection management or other control plane traffic) may be received via interrupts. Processing of the frames may be performed in the context of the internal service requests (ISRs), including tasks such as sending/queuing frames that need to be transmitted in response to received frames.

With respect to frame header setup, the speed test control application 104 may setup the Tx and Rx frame headers for the driver to process packets. This includes Ethernet preamble enable, the source and destination media access control (MAC) addresses, the inner and outer virtual local area network (VLAN) tags, the inner and outer VLAN identification (ID), Digital Intel Xerox (DIX) framing or IEEE 802.3 framing, Multi-protocol label switching (MPLS) labels if any, special Ether type, and jumbo frame support.

The speed test control application 104 may setup the filters for the ether type of the packets of interest so that the driver can hand off the packet to the hardware-based traffic analyzer 112. This may include IPv4 ethtype 0x800, ARP ethtype 0x806, etc.

With respect to client socket setup, in order to utilize the hardware-based traffic analyzer 112, the call to create the socket may be specified as follows: socket s=socket(special, SOCK_STREAM,0). The driver may need the values of SO_SNDBUF to set the send buffer size, Optional IP Type of Service to be used, MSS, and no delay option via the setsockopt call.

The input/output control calls may be used to pass the IP type of service (ToS) and VLAN user priority values to the driver. These may be used to configure the Tx profile memory during connection establishment. The Rx classifier memory may also be reset. The data connection may be transferred to the hardware-based traffic analyzer 112 after the SYN-ACK is received and before the ACK is sent out.

The following sequence of events may be implemented at connection establishment:
  connect( ) is called
  Driver sends a SYN packet
  Driver gets a SYN-ACK from the server
  Driver sets up the connection in the hardware-based traffic analyzer 112
  Driver configures an Rx classifier in the hardware-based traffic analyzer 112
  Driver configures a Tx profile memory in the hardware-based traffic analyzer 112
  Driver sends an ACK With respect to server socket setup, in order to use the hardware-based traffic analyzer 112, the call to create the socket may be specified as follows: socket s=socket(special, SOCK_STREAM,0);

A proprietary driver may need the following values via the setsockopt call: SO_RCVBUF to set the send buffer size, Optional IP Type of Service to be used, MSS, and no delay option.

The input/output control calls may be used to pass the IP ToS and VLAN user priority values to the driver. These may be used to configure the Tx profile memory during connection establishment. The Rx classifier memory may also be reset.

The connection may be transferred to the hardware-based traffic analyzer 112 after the SYNchronize (SYN) is received and before the SYN-ACK is sent out. This is because as soon as the SYN-ACK is sent out, the ACK may be received, and may carry receive data bytes.

The following sequence of events may occur at connection establishment:
  listen( ) is called
  Driver receives a SYN packet from the client
  Driver sets up the connection in the hardware-based traffic analyzer 112
  Driver configures the Rx Classifier in the hardware-based traffic analyzer 112
  Driver configures the Tx profile memory in the hardware-based traffic analyzer 112
  Driver sends a SYN-ACK to the client
  Hardware-based traffic analyzer 112 receives an ACK from the client
  Connection status is updated in the driver via polling the hardware-based traffic analyzer 112 and the connection is established With respect to connection teardown, the following sequence of events may occur at connection teardown:
  close( ) is called
  Driver configures the hardware-based traffic analyzer 112 to close the connection
  Hardware-based traffic analyzer 112 sends a FIN and processes the FIN-ACK and the FIN from the remote
  Connection status is updated in the driver via polling the hardware-based traffic analyzer 112 and the connection is closed
  Driver configures the Rx classifier memory in the hardware-based traffic analyzer 112 to invalidate the connection entry
  Driver configures the attribute in the hardware-based traffic analyzer 112 to invalidate the connection
  If hardware-based traffic analyzer 112 receives a frame with reStructuredText (RST), the driver receives an update via polling the hardware-based traffic analyzer 112 and close the connection With respect to the hardware-based traffic analyzer 112 configuration, the hardware-based traffic analyzer 112 may utilize software to configure a Rx classifier and Tx profile memory subsystems.

The Rx classifier may be configured with the connection n-tuple information. The n-tuple from the received frame may be used to perform a linear search through the classifier table. On a match, the header from the frame along with the Connection ID may be passed to the hardware-based traffic analyzer 112.

The Rx classifier of the hardware-based traffic analyzer 112 may be configured after receiving the SYNchronize-ACKnowledge (SYN-ACK) and before sending the ACK. The entry valid attribute may also be set. In addition, the connection valid hardware-based traffic analyzer 112 attribute may be configured and propagated as a result, and used by software to gate all the results.

The Rx classifier of the hardware-based traffic analyzer 112 acting as the speed test control server 110 may be configured after receiving the SYN and before sending the SYN-ACK. The entry valid attribute may be set in the Rx classifier. The connection valid attribute may not be set until the hardware-based traffic analyzer 112 receives the ACK.

With respect to the Tx profile memory, the attributes needed to build the outgoing traffic frames per connection may be configured in both client and server modes, and include the following:
  Ethernet source MAC
  Ethernet destination MAC
  Ethernet encapsulation
    DIX
    IEEE 802.3 LLC/SNAP
    VLAN
  VLAN tag
  VLAN ID
  Source IPv4/IPv6 address
  Destination IPv4/IPv6 address
  IPv4 Type Of Service
  IPv6 Traffic Class
  IP TTL Traffic Source Port
Traffic Destination Port With respect to connection results, the hardware-based traffic analyzer 112 Rx module may include the results collected, for example, for up to 128 connections. The results for all the connections may be gathered all the time. The latch interval for the results may be 1 second. The results may be held in hardware-based traffic analyzer 112 memory. The following may include the per-connection results for both client and server mode:

Tx payload byte count (excluding retransmitted bytes)
Rx payload byte count (excluding duplicate bytes)
Tx Total Frame count
Rx Total Frame count
Tx Total retransmission count
Tx retransmission count (timeout related)
Tx retransmission count (Fast Retransmit, Triple ACK)
Tx retransmission count (Fast recovery)
Tx ACK count
Rx ACK count
Acknowledged payload byte count
Max unacknowledged data, in-flight data
Current/Min/Max/Avg RTT
Current/Min/Max/Avg Window Size
Current/Min/Max/Avg Throughput
Send Window Closed count
Send Window probe count
Send Window update count
Number of single frame loss
Number of multiple frame loss Other results that aid in debugging may include connection management frame counts, parameters exchanged during connection management such as max segment size is logged by the driver using the/proc interface, etc.

With respect to hardware driver input/output controls, the following input/output controls may be used in communicating with the hardware driver:

IPB_IOCTL_TTTOE_SET_RCV (Set the amount of bytes to be received)
IPB_IOCTL_TTTOE_GET_RCVD (Get the current amount of bytes received)
IPB_IOCTL_TTTOE_SET_SND (Set the amount of bytes to be sent)
IPB_IOCTL_TTTOE_GET_SENT (Get the current amount of bytes sent)
IPB_IOCTL_TTTOE_SET_IPv6 (Set IPv6 support in hardware-based traffic analyzer 112)
IPB_IOCTL_TTTOE_SET_TRAFFIC (Set traffic direction (download/upload)
IPB_IOCTL_TTTOE_SET_VLAN (Set VLAN ID)
IPB_IOCTL_TTTOE_SET_GW_ENABLE (Set the Gateway address to be used/resolved)
IPB_IOCTL_TTTOE_SET_TOS (Set IPv4 TOS/Ipv6 Traffic class)
IPB_IOCTL_TTTOE_SET_TS (Enable timestamps)

With respect to software integration changes, in the shared library model, software may be changed to consolidate the core functionality of socket setup, data transfer and statistics reporting to the functions, which is part of system software. When the application is started with this special switch, it may be expected that a single function named hardware_setup (which would include the socket call, bind call, connect call), hardware_send (upload test and include the send call), hardware_recv (download test and includes the recv call), and hardware_statistics may be utilized. These functions may be wrapped into a shared library where the actual specific functions to exercise the hardware-based traffic analyzer 112 are invoked. Thread scheduling and priority may be handled via the apparatus 100 as follows:

```
#define _GNU_SOURCE
#include "accelerate.h"
int hardware_setup (int param1, int param2, int param3)
{
    int (*sys_hardware_setup)(int,int,int) =
dlsym(RTLD_NEXT,"Hardware_socket_setup");
    return sys_hardware_setup(param1,param2,param3);
}
This may be compiled into a shared library as follows:
    gcc -fPIC -rdynamic -c sys_hardware.c
    gcc -shared -o libsys_hardware.so sys_hardware.o -lc -ldl
```

Figure 7:
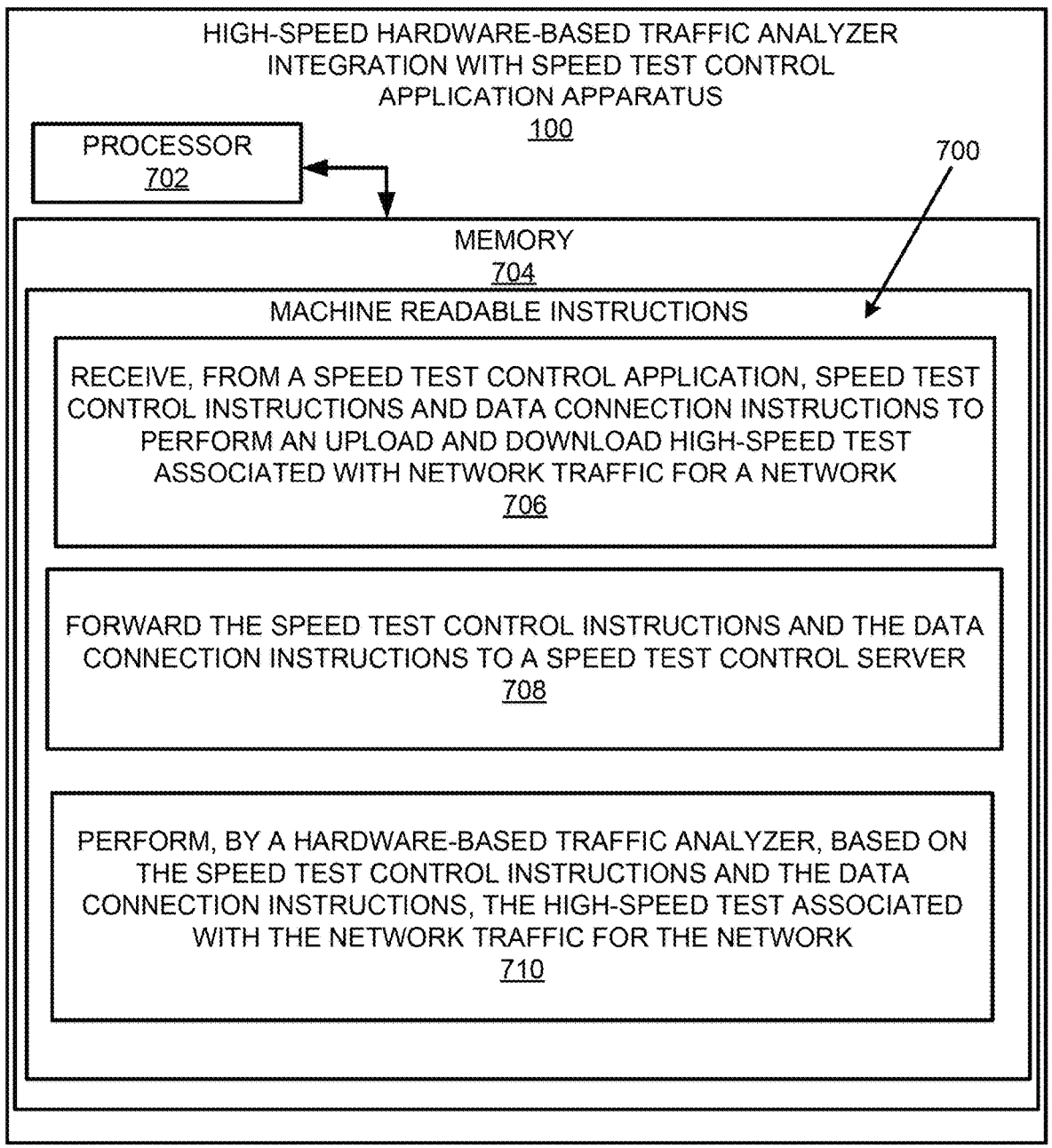
FIG. 7 illustrates an example block diagram for high-speed hardware-based traffic analyzer integration with speed test control application in accordance with an example of the present disclosure.
Figure 9:
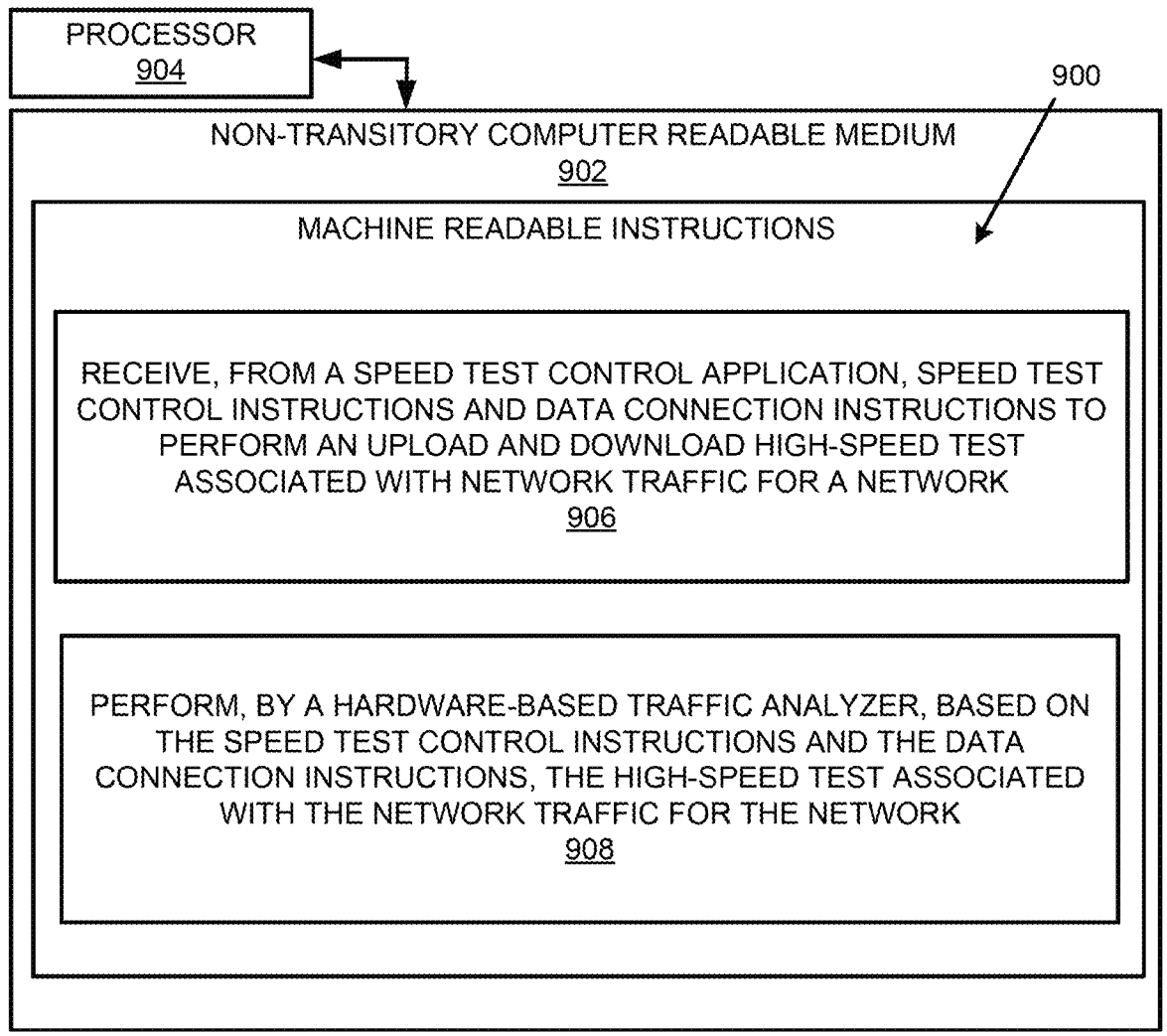
FIG. 9 illustrates a further example block diagram for high-speed hardware-based traffic analyzer integration with speed test control application in accordance with another example of the present disclosure.

FIGS. 7-9 respectively illustrate an example block diagram 700, a flowchart of an example method 800, and a further example block diagram 900 for high-speed hardware-based traffic analyzer integration with speed test control application, according to examples. The block diagram 700, the method 800, and the block diagram 900 may be implemented on the apparatus 100 described above with reference to FIG. 1 by way of example and not of limitation. The block diagram 700, the method 800, and the block diagram 900 may be practiced in other apparatus. In addition to showing the block diagram 700, FIG. 7 shows hardware of the apparatus 100 that may execute the instructions of the block diagram 700. The hardware may include a processor 702, and a memory 704 storing machine readable instructions that when executed by the processor cause the processor to perform the instructions of the block diagram 700. The memory 704 may represent a non-transitory computer readable medium. FIG. 8 may represent an example method for high-speed hardware-based traffic analyzer integration with speed test control application, and the steps of the method. FIG. 9 may represent a non-transitory computer readable medium 902 having stored thereon machine readable instructions to provide high-speed hardware-based traffic analyzer integration with speed test control application according to an example. The machine readable instructions, when executed, cause a processor 904 to perform the instructions of the block diagram 900 also shown in FIG. 9.

The processor 702 of FIG. 7 and/or the processor 904 of FIG. 9 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to receive, from a speed test control application 104, speed test control instructions and data connection instructions to perform an upload and download high-speed test associated with network traffic 106 for a network 108.

The processor 702 may fetch, decode, and execute the instructions 708 to forward the speed test control instructions and the data connection instructions to a speed test control server 110.

The processor 702 may fetch, decode, and execute the instructions 710 to perform, by a hardware-based traffic analyzer 112, based on the speed test control instructions and the data connection instructions, the high-speed test associated with the network traffic 106 for the network 108.

Referring to FIGS. 1-6 and 8, and particularly FIG. 8, for the method 800, at block 802, the method may include receiving, from a speed test control application 104, speed test control instructions and data connection instructions to perform an upload and download high-speed test associated with network traffic 106 for a network 108.

At block 804, the method may include forwarding the speed test control instructions and the data connection instructions to a speed test control server 110.

At block 806, the method may include performing, by a hardware-based traffic analyzer 112, based on the speed test control instructions and the data connection instructions, the high-speed test associated with the network traffic 106 for the network 108.

Referring to FIGS. 1-6 and 9, and particularly FIG. 9, for the block diagram 900, the non-transitory computer readable medium 902 may include instructions 906 to receive, from a speed test control application 104, speed test control instructions and data connection instructions to perform an upload and download high-speed test associated with network traffic 106 for a network 108.

The processor 904 may fetch, decode, and execute the instructions 908 to perform, by a hardware-based traffic analyzer 112, based on the speed test control instructions and the data connection instructions, the high-speed test associated with the network traffic 106 for the network 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   at least one hardware processor;
   a memory storing machine readable instructions, the machine readable instructions, when executed by at least one hardware processor, cause the at least one hardware processor to:
      receive, from a speed test control application installed on the apparatus, speed test control instructions and data connection instructions for the apparatus to perform a high-speed test associated with network traffic of a network; and
      forward the speed test control instructions and the data connection instructions to a speed test control server; and
   a hardware-based traffic analyzer comprising a data port to, based on the speed test control instructions and the data connection instructions forwarded to the speed test control server, establish a connection with the speed test control server, and perform the high-speed test associated with the network traffic of the network by transmitting and receiving relatively high bit-rate data to and from the speed test control server, and a control port to transmit relatively slow-speed control traffic to the speed test control application,
   wherein the at least one hardware processor is further to:
      receive results of the high-speed test from the speed test control server; and
      transmit the results of the high-speed test to the speed test control application.

2. The apparatus according to claim 1, wherein the speed test control server is located in a Cloud environment.

3. The apparatus according to claim 1, wherein the speed test control application is implemented by a central processing unit (CPU) of the apparatus.

4. The apparatus according to claim 1, wherein the hardware-based traffic analyzer is implemented to include a Field Programmable Gate Array (FPGA) to handle the relatively high bit-rate data.

5. The apparatus according to claim 1, wherein the machine readable instructions, when executed by the at least one hardware processor, further cause the at least one hardware processor to:
   utilize Transmission Control Protocol/Internet Protocol (TCP/IP) to transmit and receive the relatively high bit-rate data between the speed test control server and the hardware-based traffic analyzer.

6. A method for comprising:
   receiving, by at least one hardware processor in an apparatus, from a speed test control application installed on the apparatus, speed test control instructions and data connection instructions for the apparatus to perform a high-speed test associated with network traffic of a network;
   forwarding, by the at least one hardware processor, the speed test control instructions and the data connection instructions to a speed test control server;
   establishing, by a hardware-based traffic analyzer in the apparatus, based on the speed test control instructions and the data connection instructions forwarded to the speed test control server, a connection between a data port of the hardware-based traffic analyzer and the speed test control server;
   performing, by the hardware-based traffic analyzer, the high-speed test associated with the network traffic of the network by transmitting and receiving, via the data port of the hardware-based traffic analyzer, relatively high bit-rate data to and from the speed test control server;
   receiving, by the at least one hardware processor, results of the high-speed test from the speed test control server;
   transmitting, by the at least one hardware processor, the results of the high-speed test to the speed test control application; and
   transmitting, via a control port of the hardware-based traffic analyzer, relatively slow-speed control traffic to the speed test control application.

7. The method according to claim 6, wherein the speed test control server is located in a Cloud environment.

8. The method according to claim 6, wherein the high-speed test is an uploaded and downloaded high-speed test.

9. The method according to claim 6, further comprising:
   implementing the speed test control application by a central processing unit (CPU) of the apparatus.

10. The method according to claim 6, wherein the hardware-based traffic analyzer is implemented to include a Field Programmable Gate Array (FPGA) to handle the relatively high bit-rate data.

11. The method according to claim 6, further comprising:
   utilizing, by the at least one hardware processor, Transmission Control Protocol/Internet Protocol (TCP/IP) to transmit and receive the relatively high bit-rate data between the speed test control server and the hardware-based traffic analyzer.

12. A non-transitory computer readable medium storing machine readable instructions, the machine readable instructions, when executed by at least one hardware processor in an apparatus, cause the at least one hardware processor to:

receive, from a speed test control application installed on the apparatus, speed test control instructions and data connection instructions for the apparatus to perform a high-speed test associated with network traffic of a network;

forward the speed test control instructions and the data connection instructions to a speed test control server;

cause a hardware-based traffic analyzer to, based on the speed test control instructions and the data connection instructions forwarded to the speed test control server, establish a connection between a data port of the hardware-based traffic analyzer and the speed test control served;

cause the hardware-based traffic analyzer to perform the high-speed test associated with the network traffic of the network by transmitting and receiving, via the data port of the hardware-based traffic analyzer, relatively high bit-rate data to and from the speed test control server;

receive results of the high-speed test associated with the network traffic from the speed test control server;

transmit the results of the high-speed test to the speed test control application; and cause the hardware-based traffic analyzer to transmit, via a control port of the hardware-based traffic analyzer, relatively slow-speed control traffic to the speed test control application.

13. The non-transitory computer readable medium according to claim 12, wherein the high-speed test is an uploaded and downloaded high-speed test.

14. The non-transitory computer readable medium according to claim 12, wherein the speed test control server is located in a Cloud environment.

15. The non-transitory computer readable medium according to claim 12, wherein the hardware-based traffic analyzer is implemented to include a Field Programmable Gate Array (FPGA) to handle the relatively high bit-rate data.

\* \* \* \* \*